UNITED STATES PATENT OFFICE.

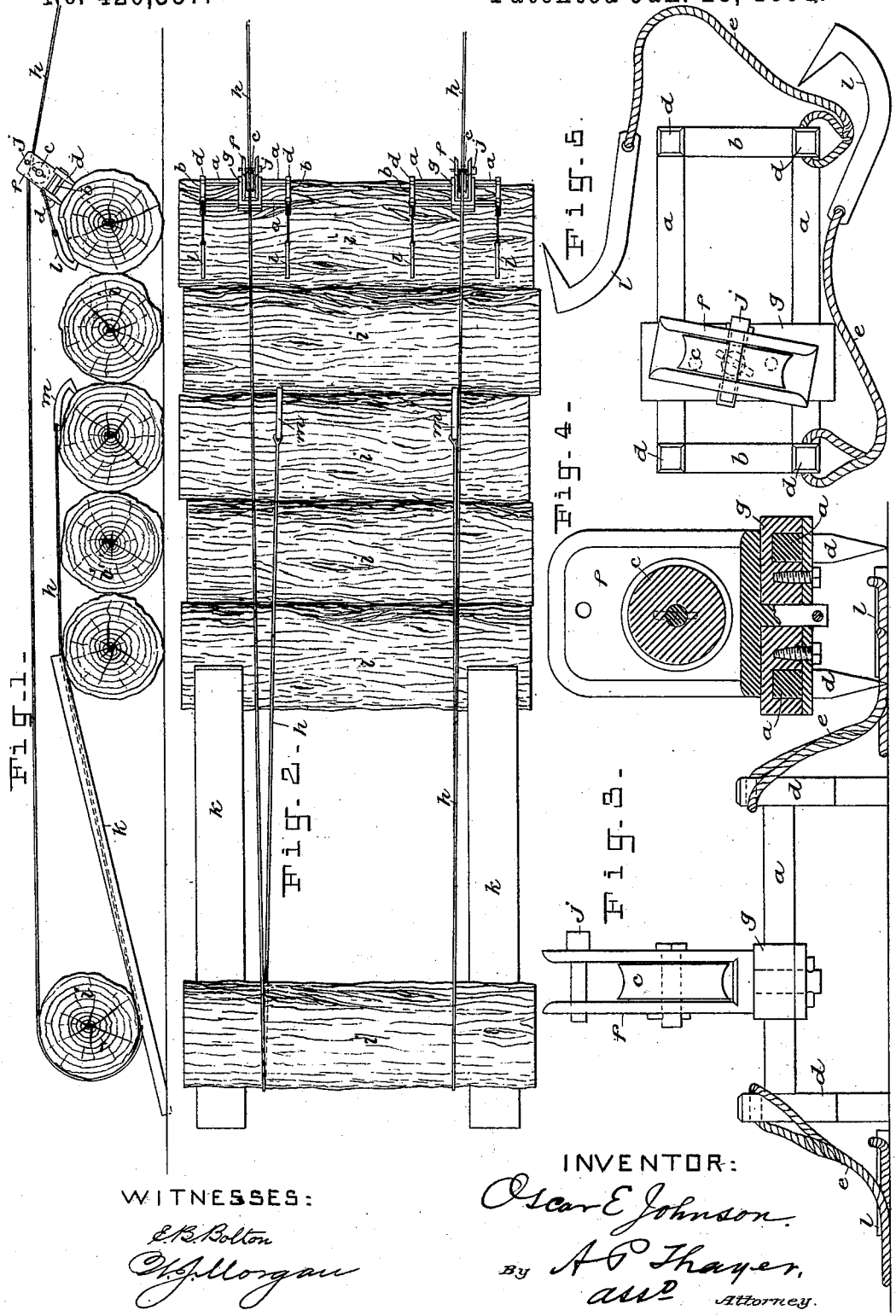

OSCAR E. JOHNSON, OF SENEY, MICHIGAN.

LOG-ROLLING APPARATUS.

SPECIFICATION forming part of Letters Patent No. 420,387, dated January 28, 1890.

Application filed April 24, 1889. Serial No. 308,491. (No model.)

*To all whom it may concern:*

Be it known that I, OSCAR E. JOHNSON, a citizen of Sweden, and a resident of Seney, in the county of Schoolcraft and State of Michigan, have invented new and useful Improvements in Log-Rolling Apparatus, of which the following is a specification.

My invention consists of a rope or chain carrying sheave device contrived to facilitate the working of log-rolling ropes or other flexible connections—as chains—used in piling logs for any purpose, as hereinafter fully described, reference being made to the accompanying drawings, in which—

Figure 1 is an end view of a partly-completed log-pile with my improved log-rolling rope or chain sheave device in position for use, and in side elevation. Fig. 2 is a plan view of the sheave device as in use on the log-pile. Fig. 3 is a front elevation. Fig. 4 is a transverse section, and Fig. 5 is a plan view.

The apparatus consists, essentially, of the sheave-block-supporting bench composed of side bars $a$, end bars $b$, and spike or wedge pointed posts $d$, adapted to be driven into the side of a log, stay-ropes or other flexible connections—as chains $e$—each having a hook or dog $l$, to anchor the frame, and the sheave $c$ and sheave-block $f$, mounted upright on the side bars of the frame by a saddle $g$, fitted to slide thereon, and the sheave-block being swivel-jointed to the saddle, so as to turn as the direction of the log-rolling rope or other flexible connections—as chain $h$—require, and the saddle being adapted to shift along the bench as the range of the rope or chain across the bench demands.

It will be seen that with this simple device, one to each rope or chain $h$, used in rolling logs $i$ up the skids $k$, to continue the pile after the first tier is rolled together, the rope or chains will be carried over the higher log or logs previously rolled up, so as to avoid the great friction, as when the rope or chain draws across the log, as it always does without the carrier, and it also prevents the cutting of the log by the rope or chain when so operated, which is injurious to logs designed for timber or lumber. The carrier also avoids, by the operation of the anchor rope or chain, the necessity of permanently chocking the logs of the second and other upper tiers to prevent the pulling effect of the ropes or chains on them tending to force them off the pile, as the said anchor ropes or chains effectually oppose all thrust on said logs in that direction.

It is to be understood that in practice two log-rolling ropes or chains are used, as shown in Fig. 2, one near each end, so as to roll the logs evenly, the power being applied by animals hitched to the ends extended over the pile, and the other ends being anchored—as at $m$—in one or more of the logs already placed in the pile, and said ropes or chains being looped around the log. The sheave-block is open at the top to facilitate the handling of the rope or chain more conveniently than if a closed block were used, and the removable guard-pin $j$ is employed to confine the rope or chain when required; but a closed block may be used, if preferred. While it is preferred to have the saddle slide and the sheave-block swiveled, the carrier will operate well without these provisions, and I do not limit myself to them.

It is to be understood that either ropes or chains may be used both for rolling the logs and anchoring the carriers. Chains will generally be employed in practice, and I mean the ropes represented in the drawings to stand for chains.

I claim as my invention—

1. The combination of the sheave-supporting bench, sheave mounted thereon, and the anchor ropes and hooks, the said bench having spike or wedge pointed legs to drive in the logs, substantially as described.

2. The combination of the sheave-supporting bench, sliding saddle on said bench, sheave mounted on said saddle, and the anchor ropes and hooks, the said bench having spike or wedge pointed legs to drive in the logs, substantially as described.

3. The combination of the sheave-supporting bench, sliding saddle on said bench, sheave swivel-jointed on said saddle, and the anchor ropes and hooks, the said bench having spike or wedge pointed legs to drive in the logs, substantially as described.

4. The combination of the sheave-supporting bench, sheave mounted thereon, anchor ropes and hooks, and the log-rolling rope, said bench having spike or wedge pointed legs to drive in the logs, substantially as described.

In testimony that I claim the foregoing as my invention I have signed my name, in presence of two witnesses, this 2d day of April, 1889.

OSCAR E. JOHNSON.

Witnesses:
A. C. CARPENTER,
J. B. WHEELER.